(12) United States Patent
Schultz et al.

(10) Patent No.: US 10,203,202 B2
(45) Date of Patent: Feb. 12, 2019

(54) NON-CONTACT DETERMINATION OF COATING THICKNESS

(71) Applicants: John Weber Schultz, Alpharetta, GA (US); Rebecca Brockway Schultz, Alpharetta, GA (US); James Geoffrey Maloney, Marietta, GA (US); Kathleen Cummings Maloney, Marietta, GA (US)

(72) Inventors: John Weber Schultz, Alpharetta, GA (US); Rebecca Brockway Schultz, Alpharetta, GA (US); James Geoffrey Maloney, Marietta, GA (US); Kathleen Cummings Maloney, Marietta, GA (US)

( * ) Notice: Subject to any disclaimer, the term of this patent is extended or adjusted under 35 U.S.C. 154(b) by 607 days.

(21) Appl. No.: 14/680,477

(22) Filed: Apr. 7, 2015

(65) Prior Publication Data

US 2015/0285621 A1 Oct. 8, 2015

Related U.S. Application Data

(60) Provisional application No. 61/975,935, filed on Apr. 7, 2014.

(51) Int. Cl.
*G01B 15/00* (2006.01)
*G01B 15/02* (2006.01)

(52) U.S. Cl.
CPC .................................. *G01B 15/02* (2013.01)

(58) Field of Classification Search
None
See application file for complete search history.

(56) References Cited

U.S. PATENT DOCUMENTS 4,045,727 A * 8/1977 Yu ........................ G01R 27/04
324/644
4,702,931 A * 10/1987 Falcoff ................. G01B 17/025
118/697

(Continued)

OTHER PUBLICATIONS

Microwave Thickness Measurements of Magnetic Coatings by D.D. Palmer, Sep. 1991.*

(Continued)

*Primary Examiner* — Evren Seven
(74) *Attorney, Agent, or Firm* — Thomas Horstemeyer, LLP (57) ABSTRACT

Various examples of methods and systems are disclosed for non-contact determination of coating thickness. In one example, among others, a method includes illuminating a surface having a layer of a coating material with electromagnetic (EM) energy transmitted at two or more frequencies, obtaining measured reflection data from reflected EM energy, and matching the measured reflection data to modeled reflection data of a reflection model based upon minimization of an error between the measured reflection data and the modeled reflection data to determine a measured thickness of the layer. In another example, a system includes a probe configured to illuminate an area of the surface including a layer of a coating material with EM energy and receive reflected EM energy, and a processing device configured to determine a measured thickness of the layer based upon minimization of an error between measured reflection data and modeled reflection data.

20 Claims, 8 Drawing Sheets

(56) References Cited

U.S. PATENT DOCUMENTS

| | | | | |
|---|---|---|---|---|
| 5,038,615 | A * | 8/1991 | Trulson | G01B 17/025 367/100 |
| 5,539,322 | A * | 7/1996 | Zoughi | G01N 22/00 324/642 |
| 5,748,003 | A * | 5/1998 | Zoughi | G01B 15/00 324/237 |
| 6,005,397 | A * | 12/1999 | Zoughi | G01B 15/02 324/644 |
| 6,120,833 | A * | 9/2000 | Bonnebat | G01B 7/085 118/712 |
| 6,198,293 | B1 * | 3/2001 | Woskov | G01B 15/02 324/637 |
| 6,317,651 | B1 * | 11/2001 | Gerstenberger | B25J 9/1664 700/245 |
| 6,349,128 | B1 * | 2/2002 | Nelson | G01B 15/02 378/44 |
| 6,462,561 | B1 * | 10/2002 | Bigelow | G01N 22/00 175/45 |
| 6,489,741 | B1 * | 12/2002 | Genov | B25J 9/1615 318/561 |
| 6,512,810 | B1 * | 1/2003 | Haszler | G01B 15/02 378/45 |
| 6,522,285 | B2 * | 2/2003 | Stolarczyk | F41H 11/12 342/118 |
| 6,674,292 | B2 * | 1/2004 | Bray | G01N 17/00 324/637 |
| 6,787,773 | B1 * | 9/2004 | Lee | G01B 15/02 250/310 |
| 7,173,435 | B1 * | 2/2007 | Fay | G01B 15/02 324/635 |
| 8,581,602 | B2 * | 11/2013 | Bray | 324/642 |
| 8,653,828 | B2 * | 2/2014 | Hancock | A61B 18/18 324/601 |
| 9,007,070 | B2 * | 4/2015 | McErlean | A61B 18/1815 324/642 |
| 9,429,422 | B2 * | 8/2016 | Bray | |
| 9,880,110 | B2 * | 1/2018 | Ruege | G01N 22/02 |
| 2003/0132381 | A1 * | 7/2003 | Itagaki | G01B 15/02 250/310 |
| 2003/0132765 | A1 * | 7/2003 | Yamada | G01B 15/02 324/702 |
| 2004/0239345 | A1 * | 12/2004 | Amini | G01B 7/105 324/702 |
| 2005/0156606 | A1 * | 7/2005 | Sergoyan | G01B 15/02 324/635 |
| 2006/0164104 | A1 * | 7/2006 | Tada | G01B 15/02 324/646 |
| 2008/0278155 | A1 * | 11/2008 | Magnusson | G01B 7/105 324/234 |
| 2013/0144554 | A1 * | 6/2013 | Walton | G01B 15/02 702/172 |
| 2014/0324384 | A1 * | 10/2014 | Gay | G01B 7/105 702/170 |
| 2015/0212060 | A1 * | 7/2015 | Van Mechelen | G01N 33/32 250/338.1 |
| 2015/0377801 | A1 * | 12/2015 | Sugimoto | G01N 23/083 378/54 |
| 2016/0298957 | A1 * | 10/2016 | Little, Jr. | G01N 22/00 |

OTHER PUBLICATIONS

Hasar, "A New Method for Evaluation of Thickness and Monitoring Its Varation of Medium-and-Low-Loss Materials," Progress in Electromagnetics Research, PIER 94, pp. 403-418, 2009.

Press, et al. "Numerical Recipes in C, the Art of Scientific Computing," Cambridge University Press, pp. 408-412.

* cited by examiner

| Specimen | Microwave Probe Thickness | Micrometer Thickness |
|---|---|---|
| 38 coats | 0.097" | 0.0957" |
| 20 coats | 0.050" | 0.0519" |
| 10 coats | 0.020" | 0.0231" |

NON-CONTACT DETERMINATION OF COATING THICKNESS

CROSS REFERENCE TO RELATED APPLICATIONS

This application claims priority to, and the benefit of, U.S. provisional application entitled "NON-CONTACT METHOD FOR DETERMINING COATING THICKNESS" having Ser. No. 61/975,935, filed Apr. 7, 2014, which is hereby incorporated by reference in its entirety.

BACKGROUND

Coatings are used in a wide variety of applications to protect underlying structures from their environments. For example, coatings can be used to resist corrosion, to provide thermal insulation, to prevent mechanical damage, to reduce radar observability, or to protect from lightning strikes. Coatings include, for example, paint and polymer-based appliques, which are being considered by military and commercial aviation operators as an alternative to paint.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples of methods and systems related to non-contact determination of coating thickness. Reference will now be made in detail to the description of the embodiments as illustrated in the drawings, wherein like reference numbers indicate like parts throughout the several views.

Advanced air, ground, and sea-borne vehicles often utilize specialty coatings to improve survivability, to isolate antennas, or to reduce electromagnetic (EM) interference. These coatings can be sprayed on, and industrial robots are often used to automate this application. However, variations in the spray or deposition hardware, physical and environmental conditions during the application of the material, as well as changes in the physical properties (e.g., viscosity) of the coating material can result in thickness variations. These thickness variations may be detrimental to the performance of the specialty coating. For quality control, process monitoring, and cost control, it is desirable to determine the coating thickness during manufacturing. A thickness measurement of an applied coating should be non-destructive to avoid degrading the performance of the coating.

One method for determining coating thickness is the use of white light and photogrammetry. In this method, the underlying substrate is first measured to determine its exact coordinates. Then after application of the coating, a second measurement is made to determine the difference between coating surface position and the original substrate. While this method can be accurate, it suffers from a high degree of manual labor, since reference points must be placed on the surface. Photogrammetry utilizes reference "dots," which may interfere with or be covered over by the sprayed coating. Additionally, photogrammetry requires that the underlying substrate does not move or distort, which may not be practical when coatings have sufficient weight to distort the shape of the surface.

Another method for determining coating thickness is to use electromagnetic (EM) energy reflected from the coated substrate and to analyze that EM energy for waveforms that indicate interfacial reflections. In particular, EM energy is reflected from interfaces between materials with two different dielectric or magnetic properties (e.g., the air to coating interface or the coating to substrate interface). However, if the wavelength of the EM energy is large relative to the coating thickness, these interfacial reflections will "overlap" so that they cannot be distinguished from each other. In other words, the electromagnetic wavelength needs to be small relative to the thickness of the coating. With coating thicknesses typically ranging from a few thousandths of an inch or more, the EM energy is provided at Terahertz frequencies where the wavelengths are well less than the coating thickness. At these high frequencies, however, underlying substrate properties and surface roughness can have a strong influence on the reflected waveforms and bias the data so that measurement accuracy is reduced.

The present disclosure is directed to applying electromagnetic (EM) energy to the measurement of a coating, and extracting the coating thickness from the measured reflection. The wavelength of the EM energy is independent of the coating thickness, so that frequencies with electromagnetic wavelengths that are substantially longer than the thickness of the coating under test can be used. Further, separate reflection amplitudes are not needed to determine each interface of the coating. Instead, an aggregate electromagnetic reflection of all the interfaces together is combined with a theoretical or empirical reflection model to determine coating thickness. Additionally, measurements at two or more frequencies are used to uniquely associate a single coating thickness value with the measured reflection from the coating.

A probe can be used to collect reflected EM energy from a coated surface under test. The method can be non-contact by holding the probe at some distance in front of the surface under test. This stand-off distance is a function of the probe antenna design and the desired interrogation area, and enables coatings to be measured in either a wet or a dry condition. With the probe connected to a microwave source/receiver or similar instrument (e.g., a network analyzer), the probe acts as a transmitter and receiver of the EM energy. Energy radiated by the probe interacts with a finite area of the coated surface under test such that at least a portion of the EM energy is reflected from that area and received by the probe. The reduction in amplitude depends on frequency and the properties of the surface coating.

To invert the coating thickness, measurements are obtained at two or more frequencies to uniquely identify the thickness. This is because most single-layer absorbing coatings have at least one null where the reflection coefficient is a minimum at some frequency. If the thickness of the same coating material is varied, then that null will occur at different frequencies. In addition, if the reflection measurement is made at just a single frequency, then it does not necessarily identify the thickness of the coating uniquely. If the coating has multiple nulls, or for multi-null coatings, additional measurement frequencies may be needed to verify the coating thickness.

After the measurements are performed with the probe apparatus, the measured reflection data can be calibrated and processed to remove measurement errors. The measured reflection data can then be compared to an analytical or empirical reflection model to determine the layer thickness that best fits the measurement data. This model comparison can include a direct analytical calculation, a numerical iteration, and/or correlation through a look-up table. The extracted thickness can then be used to provide feedback to the coating application process and/or for quality assurance purposes.

Figure 1:
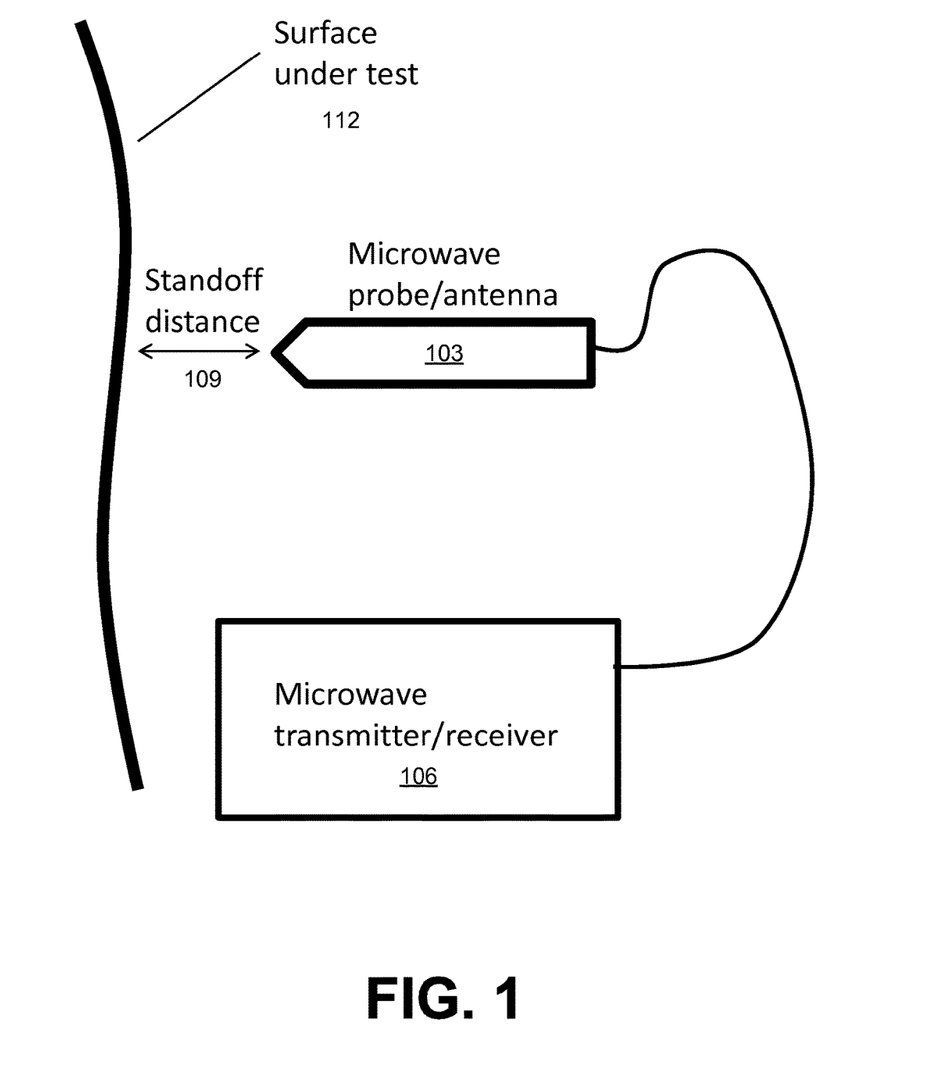
FIG. 1 is an example of a system for the non-contact determination of coating thickness in accordance with various embodiments of the present disclosure.

Referring to FIG. 1, shown is an example of a coating thickness measurement setup with a probe 103 connected to a microwave transmitter and receiver (transceiver) 106, and held at a standoff distance 109 away from the surface 112 with the coating being measured. In the embodiment of FIG. 1, the probe 103 can be used to both illuminate the surface under test and collect reflected EM energy from that surface. In other embodiments, two probes 103 can be used simultaneously: a first probe coupled to a microwave transmitter to illuminate the surface under test with EM energy, and a second probe coupled to a microwave receiver to obtain the reflected EM energy from the illuminated area. The probe 103 can, e.g., be mounted on an automated scanning system, on a robot, or can be hand-held during acquisition of the reflected EM energy data. The measured reflection data can then be processed to determine the thickness of the coating applied to the surface 112.

The probe 103 can be an antenna that illuminates a finite area of the surface under test, e.g., a horn antenna, a dielectric rod antenna, or other similar device. The probe 103 can also be a specially designed antenna that combines conductive radiating elements with dielectric materials to achieve a specific illumination area and frequency performance. The probe 103 may be designed with an attached or integrated lens, optimized to achieve a specified size, shape, and/or phase characteristics of the illumination area for a desired standoff distance. The probe 103 may be an array antenna that uses phased array concepts to control the size, shape, and/or phase characteristics of the illumination for a specified standoff distance. The transceiver (or transmitter/receiver) 106 can be a microwave source such as, e.g., a network analyzer or other similar instrument that transmits incident EM energy and/or receives the reflected EM energy from the illuminated area via the probe 103. The transmitter/receiver 106 may operate in either a stepped frequency mode or in a pulsed mode. If in pulsed mode, Fourier transform processing can be used to obtain reflection data at different frequencies. For testing of the coating material, the frequency range of the microwave transmitter/receiver should correspond to the frequency range over which the absorber coating is designed to operate. Additionally, the frequency range of the microwave transmitter/receiver 106 should overlap the frequency of operation for the probe 103.

The probe (or probe antenna) 103 combined with the microwave transmitter/receiver 106 interacts with a finite area of the surface 112 under test and receives the EM energy reflected from that area, reduced by some amplitude that depends upon the properties of the surface. The reflected EM energy can be can be measured by the transceiver 106 for processing and/or storage in memory, or may be communicated to a processing device for processing and/or storage in a data store. During measurement of the coating thickness, the probe 103 is located at a standoff distance 109 from the surface 112 under test, which is a function of the probe antenna design and the desired interrogation area. In most embodiments, the probe antenna will have an aperture size that is less than one or two wavelengths in diameter. For these probes 103, the area of illumination will increase with increasing standoff distance. Thus it is possible to tune the illumination area simply by increasing or decreasing the distance between the probe 103 and the surface 112 under test. However as the standoff distance 109 is increased, the radiation loss of the probe 103 also increases, and less of the reflected energy is received. Thus, the standoff distances are typically kept to less than a few inches. It is also possible to design a probe 103 with an aperture of more than a couple of wavelengths in diameter. In this case the probe 103 may be designed to focus the emitted or received energy so that the illumination area is either collimated (approximately constant with standoff distance) or even focused (decreases with standoff distance). The microwave transceiver 106 can be configured to step through a series of different frequencies spanning the bandwidth of the probe 103, and collect the reflection data at each of these frequencies. Thus reflected energy is measured at two or more frequencies, with each collected reflection frequency corresponding to the transmitted frequency during the measurement. Furthermore, unless the probe 103 emits a collimated beam, the probe 103 should be maintained at an approximately constant distance during the measurement. If the surface 112 under test is curved and the probe 103 is scanned across the surface to measure different regions, it should follow the curvature of the surface 112 so that an approximately constant standoff distance 109 is maintained.

The probe 103 can be calibrated using a "response and isolation" calibration process. In this calibration method, the probe 103 is used to measure two standards, and the measured data from these standards are applied to the measured data from the surface 112 under test to obtain calibrated reflection data. One of the calibration standards is typically free space (with no specimen), and is called the "isolation" standard. This standard provides the reflection properties of the probe 103 itself, which occur prior to the reflection of the surface 112 under test. The second standard is typically of a conductive surface such as a flat metal plate, placed at approximately the same standoff distance 109 from the probe 103 as the surface under test. This standard is called the "response." The calibrated reflection is then determined by first subtracting the isolation data from both the response data and the measurement of the surface 112 under test. Once this is done, the ratio of the isolation subtracted surface 112 under test data to the response data can provide the calibrated reflection coefficient.

Figure 2:
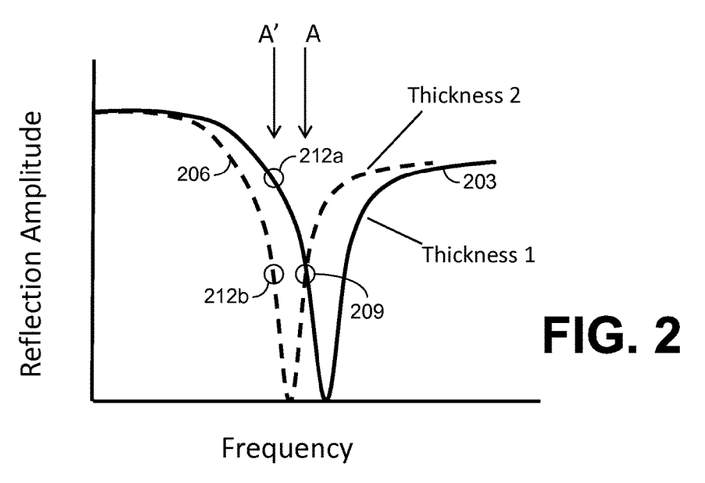
FIG. 2 illustrates an example of characteristic reflection behavior of an absorber coating in accordance with various embodiments of the present disclosure.

The coating thickness can be uniquely determined with a plurality of measurement frequencies. Referring to FIG. 2, shown is an example of the characteristic reflection behavior of a typical absorber coating for two different thicknesses. As FIG. 2 shows, most single-layer absorbing coatings show a null (or valley) where the reflection coefficient is a minimum at some frequency. For example, curve 203 illustrates the frequency-dependent reflectivity of a first thickness of an absorber coating (e.g., a specialty paint or other similar material) on a conductive surface. If the thickness of the same absorber coating is different, then the null (or valley) will occur at a different frequency as illustrated by reflectivity curve 206. If the reflection measurement is made at a single frequency, then it does not necessarily identify the coating thickness uniquely. For instance, if a measurement is done only at frequency A, the coating thickness is not uniquely determined because the measured reflection value 209 falls on multiple reflectivity curves (e.g., both curves 203 and 206).

To invert the coating thickness, measurements are needed at a minimum of two frequencies to uniquely identify the coating thickness. For example, if measurements are performed at both frequency A and frequency A', then the coating thickness can be uniquely determined. If both frequency A and frequency A' are measured in FIG. 2, then the combination of the measured reflection value 209 at frequency A and either the measured reflection value 212*a* or 212*b* uniquely identifies the reflectivity curve 203 or 206 respectively, and thus the coating thickness. In some embodiments, the coatings may exhibit multiple nulls (or valleys) in the corresponding reflectivity curve. For these multi-null coatings, three or more frequencies may be needed to uniquely identify the coating thickness. Therefore, it can be beneficial to take measurements at a large number of frequencies that span the band of operation of the probe 103 and the design frequency band of the coating under test.

Additionally, measurement uncertainty can be reduced when a broader bandwidth of the frequency signature of a coating is captured. For many microwave absorbing coatings, electromagnetic energy in the frequency range of 4 to 18 GHz can be used to determine coating thickness. In alternative embodiments, a narrower bandwidth of frequencies can be used instead with an increased measurement uncertainty. Additionally, frequencies above or below this range may also be used to improve measurement accuracy. In some cases, absorber coatings are designed to work at millimeter wave frequencies instead of microwave frequencies (e.g., as high as 100 GHz). In these cases, the measurement method along with the associated measurement and probe hardware can operate at range of frequencies that correspond to the design frequency band of the coating.

Figure 3:
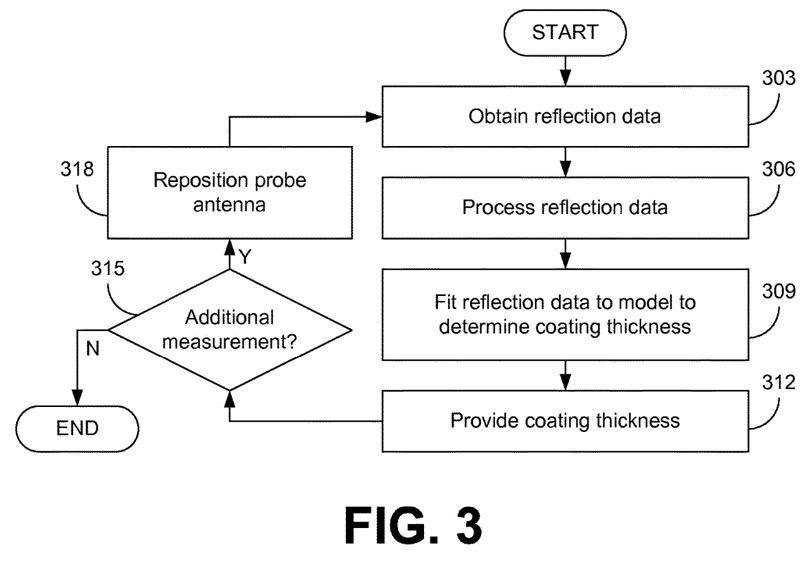
FIG. 3 is a flow chart illustrating an example of coating thickness determination in accordance with various embodiments of the present disclosure.

Referring next to FIG. 3, shown is a flow chart illustrating an example of how the coating thickness is determined using the measured reflective data. Beginning with 303, the measured reflection data is obtained by the transceiver (or receiver) 106 via the probe 103 of FIG. 1. The reflection data is measured at a plurality of frequencies within a range of measurement frequencies. For example, EM energy can be transmitted via the probe 103 at a series of predefined frequencies within a range from 4 to 18 GHz and the reflected EM energy measured using the transceiver (or receiver) 106. The measured reflection data is then processed and calibrated to remove measurement errors at 306 using, e.g., the "response and isolation" calibration process or other appropriate processing. This can also include time-domain processing to improve measurement accuracy. Time domain processing can include using a Fourier transform of frequency-dependent data to the time domain, and identifying reflection pulses within the time domain that correspond to the surface 112 under test versus other undesired reflections. The reflection from the surface 112 under test may be isolated from the other reflections and then transformed back into frequency domain.

At 309, the coating thickness (or thicknesses) can be determined using the processed measurement data. The measured reflected data can be fit or compared to a reflection model (e.g. an analytical or empirical model) to determine the coating layer thickness. The reflection model can predict the reflective characteristics of the coating material as a function of thickness. The model comparison can utilize, e.g., a direct analytical calculation, a numerical iteration, or a look-up table. For example, the coating thickness can be determined by minimizing the error between the measured reflected data and the reflection model values. The coating thickness can then be provided at 312. For example, the determined thickness information can be rendered for presentation on a display to, e.g., the operator of the probe 103 or it can be provided as feedback to the coating application system for adjustments to the process. In some implementations, the coating thickness and a corresponding measurement location can be stored for subsequent access.

In some embodiments, the coating thickness is measured at multiple locations over the coated surface 112 (FIG. 1). For instance, the probe 103 can be incrementally repositioned over the surface 112 at an interval corresponding to the area illuminated by the probe 103. At 315 of FIG. 3, it is determined whether another set of measurements is to be taken. If so, then at 318 the probe 103 is repositioned before returning to 303 to measure the reflection data at the new location. The standoff distance 109 is maintained during the repositioning. If no other measurements are to be taken, then the flow ends.

Figure 4:
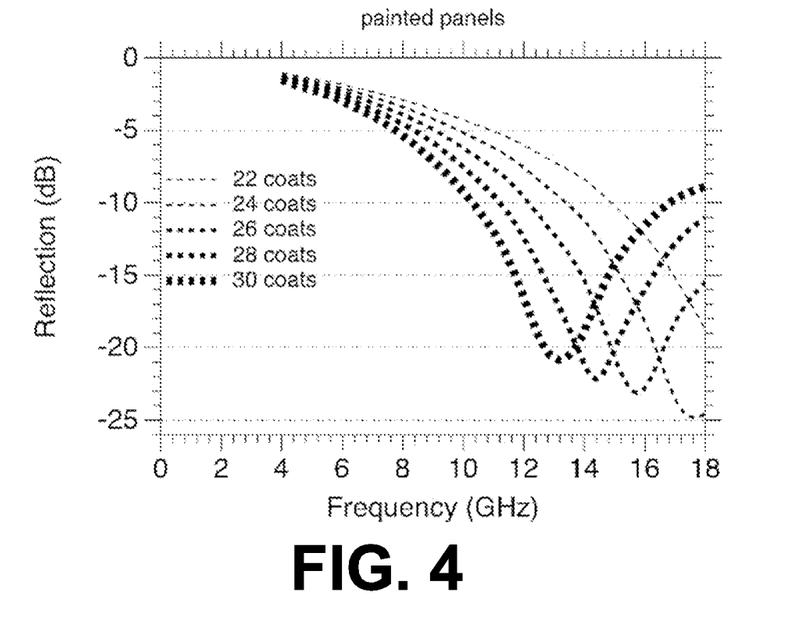
FIGS. 4 and 5 illustrate examples of measured reflection data of a coating on a conductive surface and modeled reflection data in accordance with various embodiments of the present disclosure.

Referring to FIG. 4, shown is an example of a set of measured reflection data of a commercially available coating on a conductive surface 112 (FIG. 1). The measured reflection characteristics depend on the number of coats applied to the surface 112, and therefore thickness of the coating. The measured data were obtained using a linearly polarized probe 103 (FIG. 1) coupled to a microwave network analyzer 106 (FIG. 1). In alternative embodiments, an elliptically polarized probe 103 may be used to obtain reflection characteristics of the surface 112 under test. In these measurement examples, the probe 103 was located at a standoff distance of about 7 cm in front of the surface under test. This stand-off distance 109 (FIG. 1), however, is a function of the design of the probe antenna and the desired interrogation area, and thus may vary in other implementations based at least in part upon the spread (or size) of the transmitted EM energy. In these examples, the probe was operated from 4 to 18 GHz and illuminated a circular area of the surface 112 with a diameter of about 5 cm.

In the example of FIG. 4, measurements were performed successively after each thin coat of the coating material was deposited. By using the same coating material for each coat, the overall thickness was varied without varying the characteristic properties of the single-layer coating. In this case, each coat was applied by a robotic spraying system. The measurements were made immediately after the coating material was applied so that while most of the solvent had flashed away, the coating was still tacky. The reflection characteristics for 22, 24, 26, 28 and 30 coats of the coating material are shown in FIG. 4. The data were calibrated using the "response and isolation" calibration process described above.

As can be seen in FIG. 4, the spectral reflection characteristic of the coated surface 112 is a strong function of the number of coats that have been applied. Both the position and the depth of the null (or valley) vary with the coating thickness. Thus, the aggregate reflection coefficient is directly dependent on the total number of coats of the coating material. Therefore, a backwards calculation can be used to determine the coating thickness (or the number of coats) as a function of the aggregate reflection. The backwards calculation can be done using an analytical, numerical, or statistical reflection model to determine the unknown thickness from the known reflection properties.

Figure 5:
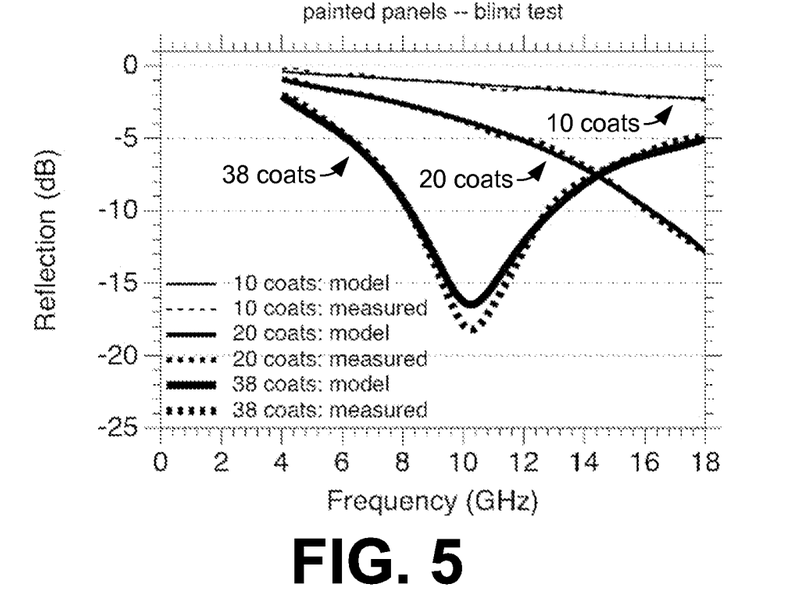

Referring next to FIG. 5, shown is an example of an analytical reflection model that can be used to fit the measured reflection data of FIG. 4. In this case, a previously measured sample of the coating material was characterized using standard laboratory methods to obtain characteristic properties of the coating (e.g., dielectric permittivity and magnetic permeability) in the appropriate frequency range. In this way, the characteristic properties of the coating material are known before the reflectivity measurements are carried out. Based on these characteristic properties, an analytical reflection model can be constructed that calculates the expected reflection coefficient for a given coating thickness. Examples of such models can be found in standard textbooks such as, e.g., *Principles of Optics* by Born et al., Cambridge Univ. Press, 6th Ed. (1980), which is hereby incorporated by reference in its entirety. For example, the following equations relate the reflection coefficient, R, to the thickness, t, of a single layer of coating material on a conductive surface 112.

$$R = \frac{Z - Z_0}{Z + Z_0}, \quad (1)$$

and $$Z = Z_0 \sqrt{\frac{\mu_r}{\varepsilon_r}} \tanh\left(-i2\pi \frac{t}{\lambda_0} \sqrt{\mu_r \varepsilon_r}\right), \quad (2)$$

where $\lambda_0$ is the free space wavelength, $Z_0$ is the impedance of free space, and $\mu_r$ and $\varepsilon_r$ are the relative magnetic permeability and relative dielectric permittivity of the coating, respectively, where $\mu_r$ and $\varepsilon_r$ can be frequency dependent parameters.

FIG. 5 compares an electromagnetic model fit to measured data for the single-layer coating at three different thicknesses with 10 coats, 20 coats and 38 coats of the coating material. In the example of FIG. 5, equations (1) and (2) were iteratively compared to the measured reflection data while varying the thickness term, t. Standard iterative solvers or root finding methods can be used to determine the coating thickness. In the example of FIG. 5, a Nelder-Mead solver was used to minimize the square of the difference between the reflection model prediction and measured data. An example of the Nelder-Mead solver is described in *Numerical Recipes 3$^{rd}$ Edition: The Art of Scientific Computing* by Press et al., Cambridge University Press, (2007), which is hereby incorporated by reference in its entirety. The following error function can be calculated to minimize the error between the reflection model and measurement values for all frequencies:

$$\text{Error} = \Sigma_f ||S_{11}^{model}(t_1, f)| - |S_{11}^{measurement}(f)||^2, \quad (3)$$

where $S_{11}$ is the reflection data, f is frequency, and $t_1$ is the coating layer thickness. This error function was computed iteratively for each of the different thicknesses until the error was minimized, e.g., to within a predefined threshold.

Figure 6:
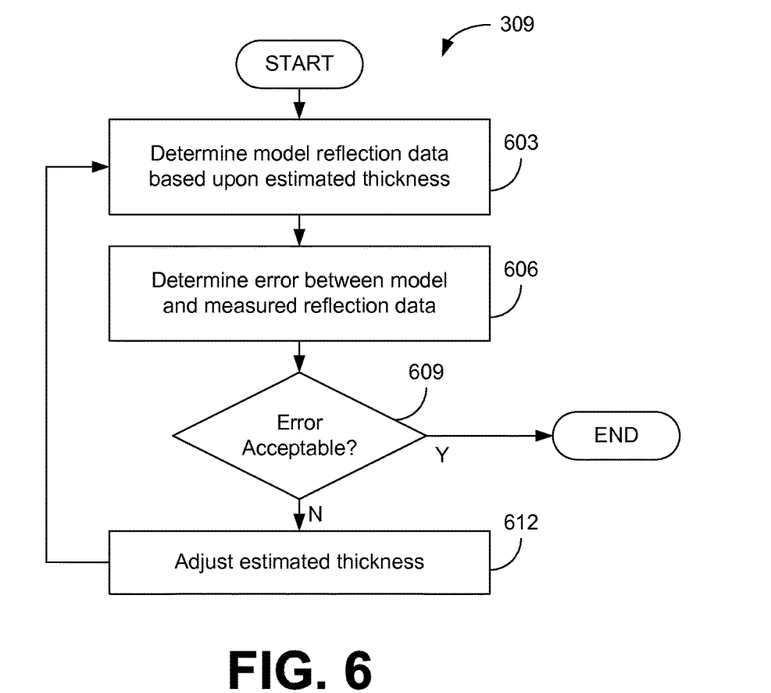
FIG. 6 is a flow chart illustrating an example of the determination of the coating thickness of FIG. 3 in accordance with various embodiments of the present disclosure.

FIG. 6 is a flow chart illustrating an example of an iterative process to fit the reflection data to the reflection model to determine the coating thickness in 309 of FIG. 3. Beginning with 603, the model reflection coefficients (R) at the various frequencies can be determine using equations (1) and (2) using an estimated coating layer thickness ($t_1$). Since the relative magnetic permeability ($\mu_r$) and relative dielectric permittivity ($\varepsilon_r$) of the coating are known a priori from the determined material properties of the coating, the remaining variable is the thickness. At 606, an error is determined based upon the determined reflection coefficients and the measured reflection data using, e.g., equation (3). If the error is acceptable at 609 (e.g., within a predefined minimization threshold), then the estimated coating layer thickness ($t_1$) is used as the coating thickness at 312 of FIG. 3. If the error is not acceptable at 609, then the estimated thickness is adjusted at 612 and the flow returns to 603 where the model reflection coefficients are determined with the adjusted thickness. The estimated thickness may be adaptively adjusted depending on the calculated error, such as is the case for the Nelder-Mead solver discussed above. Alternatively a lookup table may be pre-computed for a series of different thicknesses so that a simple search is conducted for the best pre-computed value.

Figure 7:
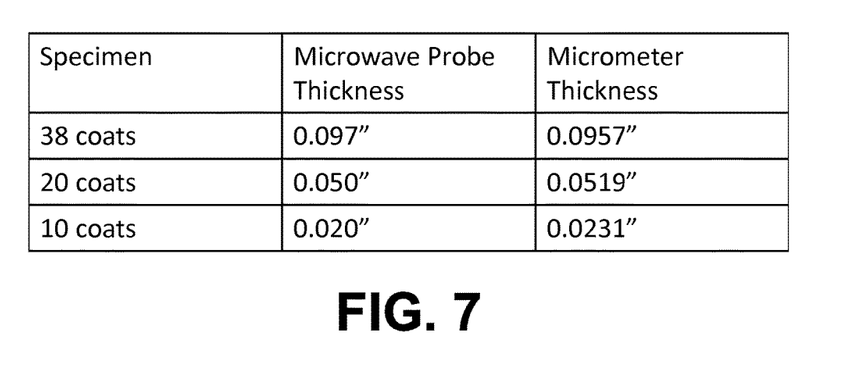
FIG. 7 is a table comparing the determined coating thickness with measured coating thickness in accordance with various embodiments of the present disclosure.

Once the fitted curves shown in FIG. 5 are obtained, the fit parameter ($t_1$) is the calculated coating thickness. FIG. 7 shows a table of thickness values based on the fitted model data and measured data for three different single-layer coating specimens. The microwave probe thickness values were determined by the model fit of FIG. 5, and the micrometer thickness values were determined after peeling the coating from the substrate and physically measuring them with a micrometer. As these data show, the physical micrometer measurements are within several thousandths of an inch of the microwave probe determined thickness. The differences between the two may be attributed to uncertainties from both the microwave measurement system and from the micrometer measurement. In addition, the micrometer measured a very small area of less than a square cm, while the probe measured an average thickness over an area of approximately 20 square cm.

Figure 8:
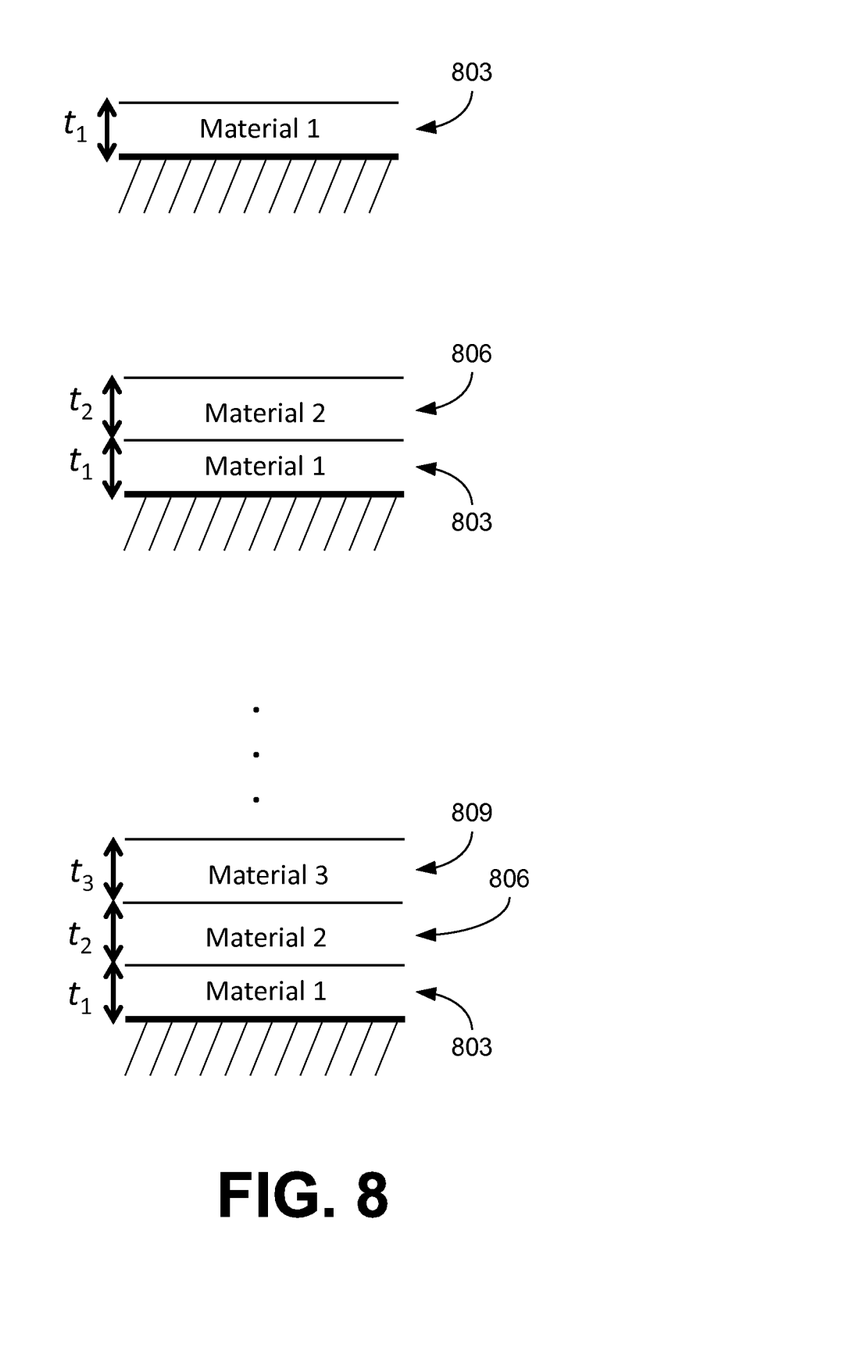
FIG. 8 illustrates examples of single-layer and multi-layer coatings on a conductive surface in accordance with various embodiments of the present disclosure.

The determination of a single-layer coating thickness can also be used for multi-layer coatings where each layer of the coating on the surface 112 (FIG. 1) comprises a different material, with a different relative dielectric permittivity ($\varepsilon_r$) and/or relative magnetic permeability ($\mu_r$). FIG. 8 provides profile views of examples of single-layer and multi-layer coatings that include two or more layers of different coating materials. Each layer of the coating can be formed by applying multiple coats of the same coating material to build the coating up to the desired thickness. For layers beyond the first layer 803, a slightly modified error function can used to determine the thickness of the additional layers of the coating. The modified error function can prevent propagation of residual errors that are present from estimation of the other layers of the coating. The modified error function uses the ratios of the reflection data for both the measurement and the reflection model. An example of the modified error function for a two-layer coating is given by:

$$\Delta S_{11}^{model} = \frac{S_{11}^{model\,layer}(t_1, f)}{S_{11}^{model\,layer\,1+2}(t_2, f)}, \quad (4)$$

and $$\Delta S_{11}^{model} = \frac{S_{11}^{measurement\,layer\,1}(f)}{S_{11}^{measurement\,layer\,1+2}(f)}. \quad (5)$$

These equations are for a two-layer coating including a second (top) layer 806 disposed on the first layer 803 as shown in the second example of FIG. 8, where $t_2$ is the thickness of the second layer 806 and $t_1$ is thickness of the first layer 803. If the coating thickness ($t_1$) of the first layer 803 was determined before the second layer 806 was deposited, then $t_1$ is fixed and the error function that is minimized is given by:

$$\text{Error} = \Sigma_f \||\Delta S_{11}^{model}(t_2,f)| - |\Delta S_{11}^{measurement}(f)|\|^2. \quad (6)$$

The determination is consistent with the flow chart of FIG. 6 with the error at 606 being determined using, e.g., equations (4), (5) and (6). For subsequent layers (e.g., 809 etc.), variations of equations (4), (5) and (6) can be used to determine the thickness of the top layer, where the thicknesses of the underlying layers are fixed (having been previously determined) and only the thickness estimations of the exposed top layer is varied to determine coating thickness.

Figure 9:
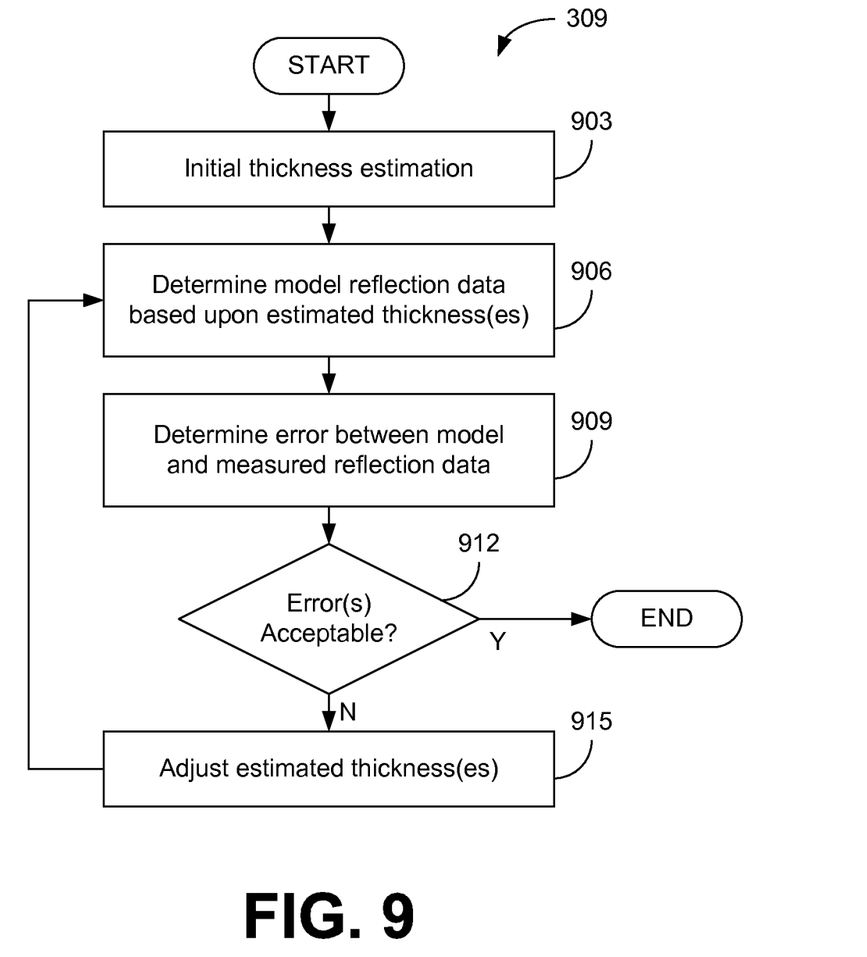
FIG. 9 is a flow chart illustrating an example of the determination of the coating thickness of FIG. 3 in accordance with various embodiments of the present disclosure.

This can also be utilized to determine the thickness of a coating layer that is applied to a semi-conductive or dielectric surface 112 (FIG. 1). In that case, the characteristic properties of the surface material (e.g., dielectric permittivity and magnetic permeability) in the appropriate frequency range, as well as the thickness of the surface material, are known. This can be considered to be a first coating layer (e.g., 803 of FIG. 8). In this way, the determination is consistent with the flow chart of FIG. 6 with the error at 606 being determined using, e.g., equations (4), (5) and (6). Subsequent layers of the coating can be determined using the same process described above.

Where multiple layer thicknesses of the multi-layer coating are unknown, the layer thicknesses can be determined with a multivariate search that simultaneously solves for multiple unknown thicknesses. For example, the thickness of each unknown layer of the coating can be determined by minimizing the error using a multivariate equation generalized from equation (3). Note that finding a unique solution in a multivariate search may require additional measurement frequencies within the measurement frequency band. FIG. 9 is a flow chart illustrating an example of a process to fit the reflection data to the reflection model to determine the coating thickness of multiple layers in 309 of FIG. 3.

Beginning with 903, the thicknesses of each layer of the coating is estimated as, e.g., the originally specified application thickness. At 906, the model reflection coefficients (R) at the various frequencies can be determined for all layers simultaneously using equations related to equations (1) and (2), which have been generalized for a multi-layer coating, using estimated coating layer thicknesses. Since the relative magnetic permeability ($\mu_r$) and relative dielectric permittivity ($\varepsilon_r$) of each layer are known a priori, the remaining variables are the thicknesses of each layer. At 909, an error is determined based upon the determined reflection coefficients and the measured reflection data using, e.g., a generalized version of equation (3). If the error is not acceptable (e.g., not within a predefined minimization threshold) at 912, then the estimated thicknesses are adjusted at 915 and the flow returns to 906 where the model reflection coefficients are determined with the adjusted thicknesses. This cycle continues until the error is acceptable at 912. If all errors are minimized (e.g., within the predefined minimization threshold or thresholds) at 912, then the estimated coating layer thicknesses are used as at 312 of FIG. 3. While the example of FIG. 9 illustrates minimizing the estimated thicknesses of all coating layers simultaneously in a multivariate search, in other embodiments the search may be conducted for each layer in series in a nested loop, or a multi-dimensional table of all combinations of thicknesses may be pre-computed for a look-up table search.

The examples of FIGS. 4, 5, and 7 demonstrate the utility of the analytical reflection model based on transmission line theory. In that case, a single-layer coating material backed by a conductive substrate 112 (FIG. 1) was examined. When multiple layers are present, more complex analytical models can be used. As with the single-layer coating, transmission line theory can be used to derive the reflection coefficient for an n-layer coating, where each layer has a different permittivity and/or permeability. In practice, a microwave probe 103 (FIG. 1) will be used with a single-layer model to first monitor the first coating layer as it is being deposited. Once the first layer is complete, a two-layer model can be used to continue to monitor the coating thickness as the second layer is being deposited. If a third layer is used, then a three-layer model can be used once the second layer is complete and the third layer is started. This can continue for an arbitrary number of different n-layers. In this case, only the top layer thickness is unknown and all the layers underneath are known by the previous measurements.

While the examples described by FIGS. 4, 5, and 7 have focused on the use of an analytical reflection model, other methods are possible. For example, a simple look-up table of frequency-dependent reflection spectra could be compared to a given measurement to establish the measured thickness. This look-up table could be derived either by an analytical reflection model or by previous measurements of known specimens. Additionally, statistical methods such as maximum likelihood estimation, multiple signal classification (MUSIC) or other algorithms could be used to determine layer thickness from such tabular data.

Figure 10:
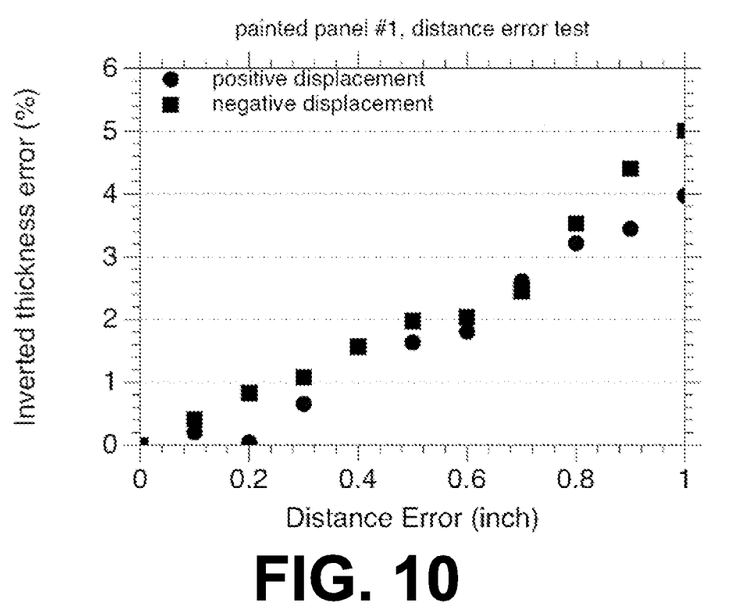
FIGS. 10 and 11 illustrate coating thickness errors due to measurement spacing variation and orientation angle variation, respectively, in accordance with various embodiments of the present disclosure.
Figure 11:
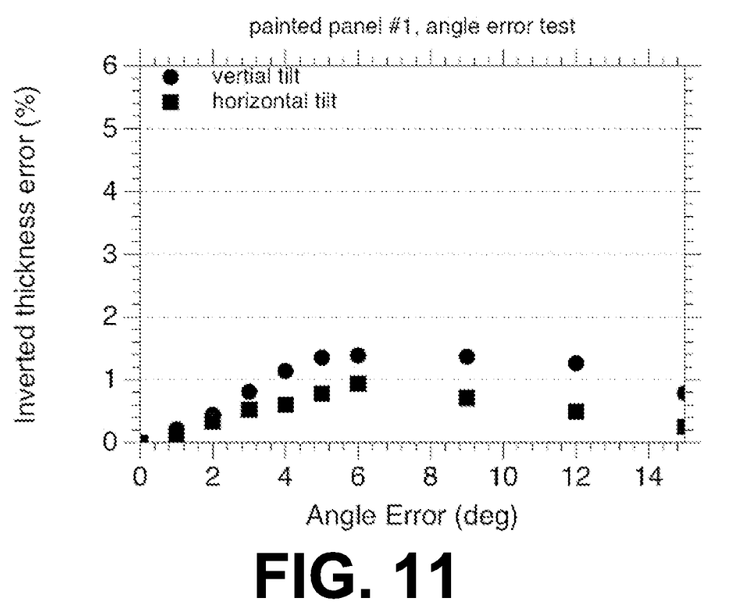

This thickness determination is especially robust to typical measurement uncertainties. For example, in a realistic scenario, a large body may be receiving a sprayed-on coating. The probe 103 (FIG. 1) used as a sensor can then be brought in to measure the surface reflectance at a number of defined points or locations for mapping the coating thickness over the surface. If the probe 103 is not placed in exactly the same orientation or in exactly the same position for each measurement, then errors from angular or positional uncertainties may result. FIGS. 8 and 9 show measured examples of these uncertainties, where the probe 103 was repositioned to have a given error. FIG. 10 shows the percent error that occurred when the spacing between the measurement surface and the microwave probe 103 was varied from the original response calibration distance and FIG. 11 shows the percent error that occurred when the microwave probe 103 was tilted away from normal incidence so that the orientation angle of the probe relative to the local surface normal of the specimen under test was varied. In both cases, significantly large deviations of the probe resulted in errors of less than a few percent. These error levels may be attributed to a function of the bandwidth of frequencies used to fit the model.

Figure 12:
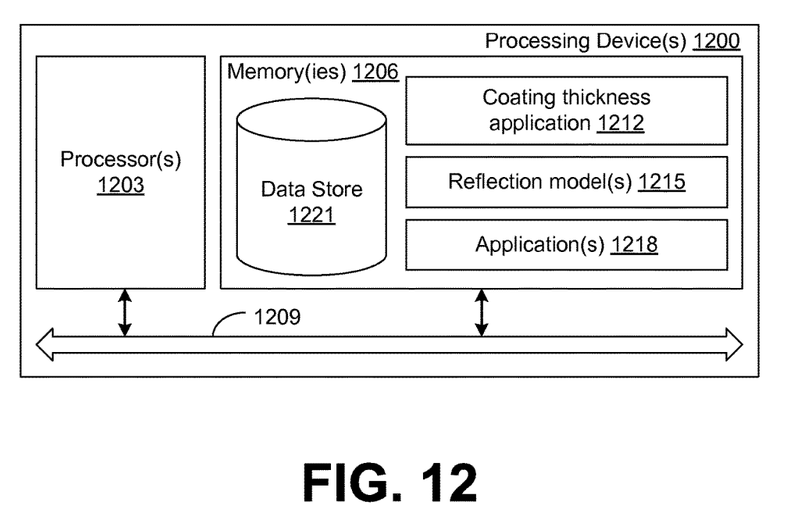
FIG. 12 is a schematic block diagram of an example of a processing device in accordance with various embodiments of the present disclosure.

With reference now to FIG. 12, shown is a schematic block diagram of a processing device 1200 according to an embodiment of the present disclosure. The processing device 1200 includes at least one processor circuit, for example, having a processor 1203 and a memory 1206, both of which are coupled to a local interface 1209. To this end, the processing device 1200 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are a coating thickness application 1212, one or more reflection model(s) 1215 that may be utilized during the coating thickness analysis, and potentially other applications 1218. Also stored in the memory 1206 may be a data store 1221 including, e.g., measured data, material properties, look up tables, and other data. In addition, an operating system may be stored in the memory 1206 and executable by the processor 1203. It is understood that there may be other applications that are stored in the memory and are executable by the processor 1203 as can be appreciated.

The flow charts of FIGS. 3, 6 and 9 illustrate architecture, functionality, and/or operation of a possible implementation of the coating thickness application 1212 with the reflection model(s) 1215. In this regard, each block can represent a module, segment, or portion of code, which comprises one or more executable instructions for implementing the specified logical function(s). It should also be noted that in some alternative implementations, the functions noted in the blocks may occur out of the order noted in FIGS. 3, 6 and 9. For example, two blocks shown in succession in FIGS. 3, 6 and 9 may in fact be executed substantially concurrently or the blocks may sometimes be executed in the reverse order, depending upon the functionality involved.

Where any component discussed herein is implemented in the form of software, any one of a number of programming languages may be employed such as, for example, C, C++, C#, Objective C, Java®, JavaScript®, Pen, PHP, Visual Basic®, Python®, Ruby, Delphi®, Flash®, or other programming languages. A number of software components are stored in the memory and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 can also facilitate communications between the processing device 1200 and the transceiver (or transmitter and receiver) 106 (FIG. 1). In some embodiments, the processing device 1200 may comprise the transceiver (or transmitter and receiver) 106 or the transceiver may be a processing device 1200. The processor 1203 may be of electrical or of some other available construction.

Although portions of the coating thickness application 1212, reflection model(s) 1215, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The coating thickness application 1212 and reflection model(s) 1215 can comprise program instructions to implement logical function(s) and/or operations of the system. The program instructions may be embodied in the form of source code that comprises human-readable statements written in a programming language or machine code that comprises numerical instructions recognizable by a suitable execution system such as a processor 1203 in a processing system 1200 or other system. The machine code may be converted from the source code, etc. If embodied in hardware, each block may represent a circuit or a number of interconnected circuits to implement the specified logical function(s).

Also, any logic or application described herein, including the coating thickness application 1212 and reflection model(s) 1215, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for non-contact determination of a coating thickness, the method comprising:
    illuminating a surface comprising a layer of a coating material with electromagnetic (EM) energy transmitted by a probe at a plurality of frequencies having wavelengths greater than a thickness of the layer of the coating material, the EM energy transmitted at a stand-off distance from the surface;
    measuring reflection data from EM energy reflected by the surface and received by the probe at the plurality of frequencies;
    matching, by a processing device, the measured reflection data to modeled reflection data of a reflection model based upon minimization of an error between amplitudes of the measured reflection data at the plurality of frequencies and the modeled reflection data to within a predefined threshold, the reflection model corresponding to a coating thickness of the layer of the coating material; and
    providing, by the processing device, the coating thickness as a measured thickness of the layer of the coating material, the coating thickness corresponding to the reflection model that minimized the error to within the predefined threshold.

2. The method of claim 1, wherein the reflection model defines the modeled reflection data as a function of a relative dielectric permittivity, a relative magnetic permeability, and the coating thickness of the coating material, where the relative dielectric permittivity and the relative magnetic permeability vary with the plurality of frequencies of the EM energy.

3. The method of claim 2, wherein the modeled reflection data at each of the plurality of frequencies is defined by:

$$R = \frac{Z - Z_0}{Z + Z_0}$$

and $$Z = Z_0 \sqrt{\frac{\mu_r}{\varepsilon_r}} \tanh\left(-i2\pi \frac{t}{\lambda_0} \sqrt{\mu_r \varepsilon_r}\right),$$

where $\lambda_0$ is a free space wavelength, $Z_0$ is an impedance of free space, $\mu_r$ is the relative magnetic permeability of the coating material, and $\varepsilon_r$ is the relative dielectric permittivity of the coating material.

4. The method of claim 1, wherein the reflection model is a look up table comprising the modeled reflection data including reflection amplitudes corresponding to each of the plurality of frequencies.

5. The method of claim 4, wherein the modeled reflection data was previously measured from layers of the coating material having a plurality of thicknesses.

6. The method of claim 1, wherein the plurality of frequencies comprise frequencies having a microwave wavelength.

7. The method of claim 1, wherein the plurality of frequencies comprise frequencies having a millimeter wavelength.

8. The method of claim 1, wherein the reflection model is a single-layer model of the coating material.

9. The method of claim 1, further comprising adjusting application of a coat of the coating material on the layer of the coating material based upon the measured thickness of the layer of the coating material, where the application of the coat of coating material changes the thickness of the layer of the coating material.

10. The method of claim 1, wherein the surface is a surface of a conductive material.

11. The method of claim 1, wherein the reflection model is a multi-layer model based upon a plurality of coating layers comprising the layer of the coating material, and a coating thickness is provided for each of the plurality of coating layers.

12. The method of claim 11, wherein the surface is a surface of a semi-conductive or dielectric material.

13. The method of claim 11, further comprising determining a coating thickness of a second layer of a second coating material disposed on the layer of the coating material by matching the measured reflection data to the modeled reflection data of the reflection model.

14. The method of claim 1, comprising applying a second layer of a second coating material on the layer of the coating material after determining the measured thickness of the layer of the coating material; and determining a coating thickness of the second layer of the second coating material by matching measured reflection data to modeled reflection data of a multi-layer model.

15. A system for non-contact determination of a coating thickness, the system comprising:

a probe configured to:

illuminate an area of a surface comprising a layer of a coating material with electromagnetic (EM) energy transmitted from the probe at a plurality of frequencies having a wavelength greater than a thickness of the layer of the coating material, and receive reflected EM energy from the surface comprising the layer of the coating material, the reflected EM energy received at the plurality of frequencies; and a processing device configured to:

match measured reflection data corresponding to the reflected EM energy at the plurality of frequencies to modeled reflection data of a reflection model based upon minimization of an error between amplitudes of the measured reflection data and the modeled reflection data to within a predefined threshold, the reflection model corresponding to a coating thickness of the layer of the coating material, and provide the coating thickness as a measured thickness of the layer of the coating material, the coating thickness corresponding to the reflection model that minimized the error to within the predefined threshold.

16. The system of claim 15, comprising a robotic arm coupled to the probe, the robotic arm configured to position the probe at a standoff distance over the surface at a plurality of predefined locations, where the probe illuminates a corresponding area of the surface at each of the plurality of predefined locations with EM energy at the plurality of frequencies, and receives reflected EM energy from the surface at each of the plurality of predefined locations.

17. The system of claim 16, wherein the processing device is configured to determine a measured thickness of the layer of the coating material at each of the plurality of predefined locations based upon the reflected EM energy received at that predefined location and the reflection model.

18. The system of claim 15, further comprising a microwave transceiver coupled to the probe, the microwave transceiver configured to generate the EM energy at the plurality of frequencies.

19. The system of claim 15, wherein application of a coat of the coating material on the layer of the coating material is adjusted based upon the measured thickness of the layer of the coating material, where the application of the coat of coating material changes the thickness of the layer of the coating material.

20. The system of claim 15, wherein the probe is a hand-held antenna.

* * * * *